April 10, 1934.  R. H. DOWNER  1,954,518
BEVERAGE DISPLAYING, REFRIGERATING, CONDITIONING, AND DISPENSING MACHINE
Filed Nov. 22, 1932  2 Sheets-Sheet 1
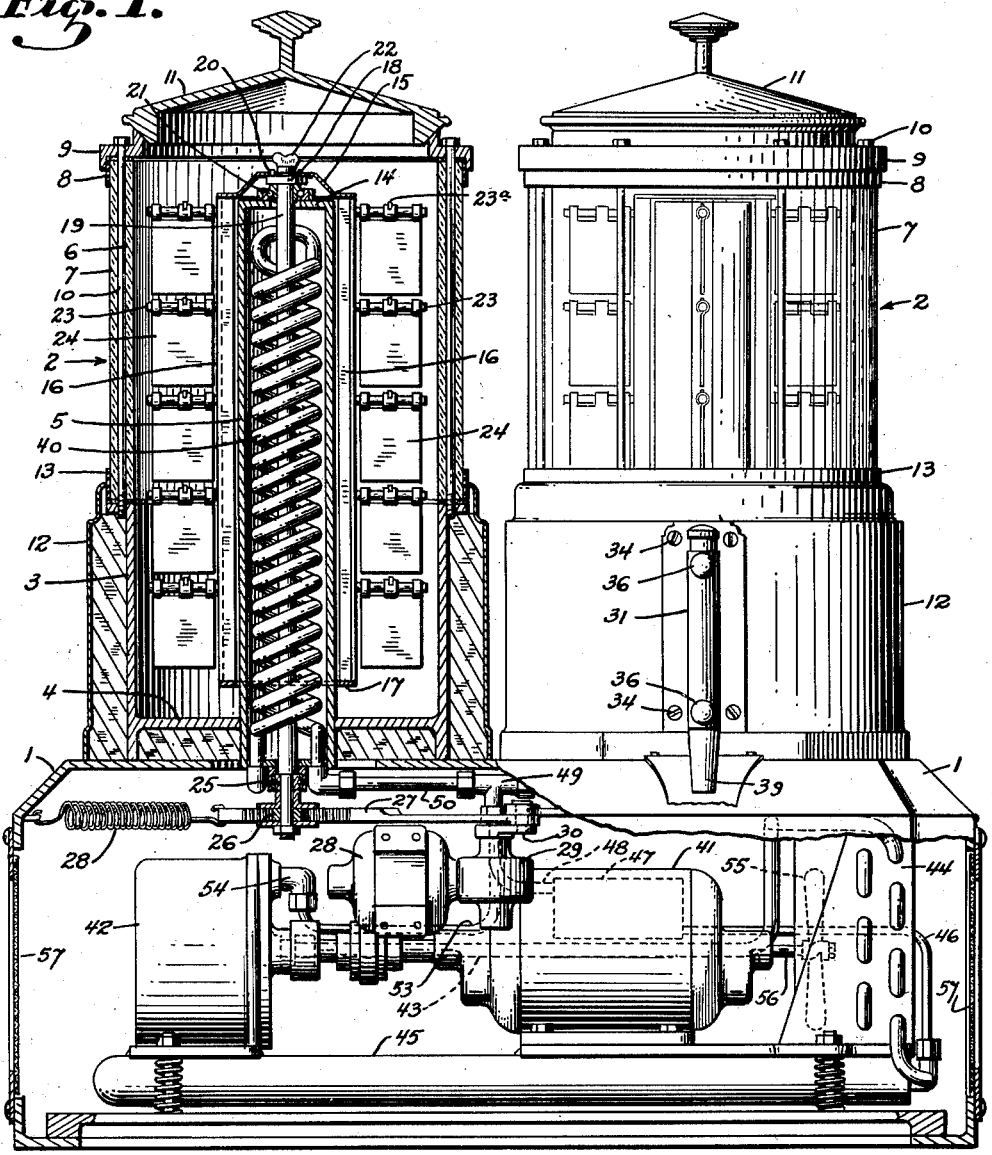
INVENTOR.
Raymond H. Downer
BY
Townsend & Loftus
ATTORNEYS.

April 10, 1934.     R. H. DOWNER     1,954,518
BEVERAGE DISPLAYING, REFRIGERATING, CONDITIONING, AND DISPENSING MACHINE
Filed Nov. 22, 1932     2 Sheets-Sheet 2
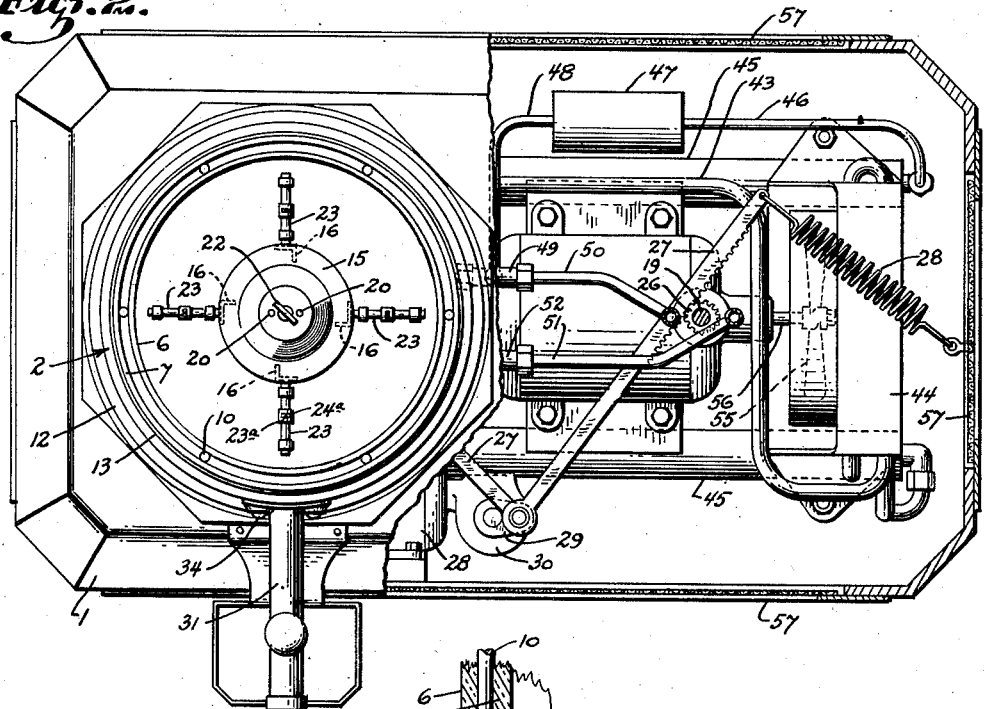
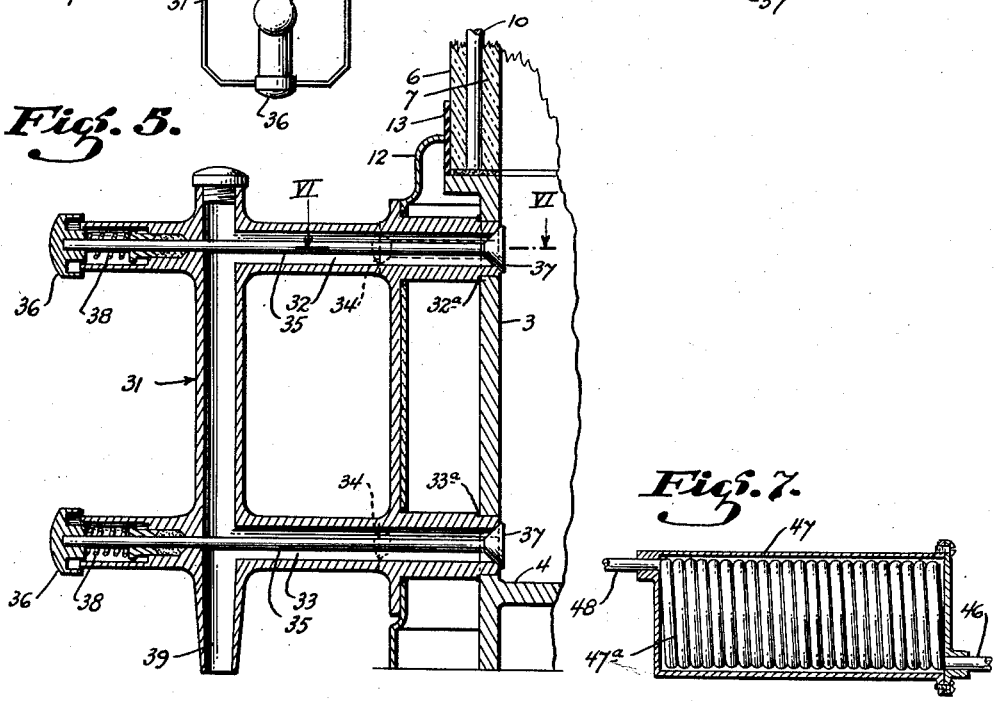
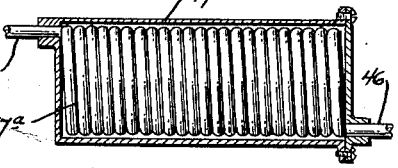
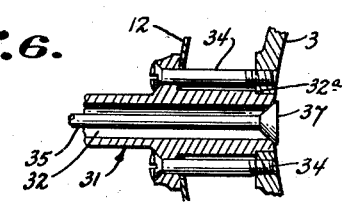
INVENTOR.
Raymond H. Downer.
BY
Townsend and Loftus,
ATTORNEYS.

Patented Apr. 10, 1934

1,954,518

UNITED STATES PATENT OFFICE 1,954,518

BEVERAGE DISPLAYING, REFRIGERATING, CONDITIONING, AND DISPENSING MACHINE

Raymond H. Downer, San Francisco, Calif., assignor to Frigidrinks, Inc., San Francisco, Calif., a corporation of Nevada Application November 22, 1932, Serial No. 643,812

10 Claims. (Cl. 62—141)

This invention relates to improvements in machines for displaying, refrigerating, conditioning, preparing and dispensing beverages, such as orange, grapefruit, pineapple, tomato and other fresh fruit and vegetable juices, having solid particles in suspension, as well as buttermilk and milk drinks. It has proven desirable to serve such a beverage with a portion of the mixture frozen into small ice particles, rather than the usual way of adding crushed ice to the fruit juice to cool it. Such a drink as is prepared and conditioned in the machine of this invention has a sparkling taste characteristic due partly to this partial freezing of the fruit juice itself, as well as to the continuous gentle oscillation of the whole mixture giving a thorough admixing of the fruit particles in the liquid, and, to the constant downward push and horizontal shift being exerted on the floating ice and fruit particles to position them in the draw-off or lower zone of the receptacle.

It is, therefore, the object of the present invention to provide, among other things, a motor operated beverage dispenser and conditioning machine having means to give a gentle horizontal and downward oscillatory movement to the mixture whereby the floating particles of fruit and ice are distributed throughout the mixture and especially in the lower or draw-off zone of the receptacle, and yet not agitate the mixture so vigorously as to "break down" the structure of the solid particles; to provide a two-level faucet in combination with said beverage receptacle whereby a drink may be dispensed containing more or less frozen particle content depending respectively on whether it be drawn from the upper or lower level of the faucet; to provide a refrigerating unit in combination with said beverage receptacle to produce the frozen particles of fruit juice in the mixture; and to provide a mechanism in combination with the refrigerating unit to regulate by resistance the flow of gas into the evaporator.

The machine is shown, by way of illustration, in the accompanying drawings, in which—

Fig. 1 is an elevation view of the machine with the exterior partly broken away to show the internal construction.

Fig. 2 is a view looking down on the top of the machine, also partly broken away to show the agitator operating mechanism and other details.

Fig. 3 is an end view of a pair of the agitating paddles, the dotted-line positions indicating the extremes of movement in each direction.

Fig. 4 is a perspective view of an agitating paddle and part of the reciprocating frame upon which its axle shaft is carried.

Fig. 5 is a vertical section showing in detail the faucet structure.

Fig. 6 is a horizontal cross-section of the faucet valve structure taken on the line 6—6 of Fig. 5.

Fig. 7 shows in detail the resistance unit of the refrigerating plant.

Broadly the machine consists of a base 1 and two beverage containing receptacles 2 mounted thereon, having disposed therein agitating means. In the base 1 is carried a refrigerating unit and mechanism for operating the agitating means. It is obvious that one, two or more beverage receptacles may be mounted on a suitable base, depending upon the use to which the machine is put.

The receptacle 2 is made up of a wall 3, having a floor 4 fitting tightly around a central tubular column 5. The upper extension of the wall 3 is cylindrical glass portion 6 fitted with a leak-tight joint to the top of 3. For purposes of insulation a concentric and slightly larger glass cylinder 7 is also mounted on an extension of the base 3. The two glasses 6 and 7 are held securely in place on the base 3 by means of rings 8, 9 and clamping bolts 10, the latter being screwed into the base 3. The upper face of the ring 9 is shaped to receive a lid 11 made of suitable non-conducting material and providing a secure closure for the container. A shell 12 is fitted around the lowermost part of the outer glass cylinder 7, and extends down to the top of the base structure 1. Interposed between the shell 12 and the glass cylinder 7 is an expansion packing 13 made of suitable material.

The column 5, which provides the inner wall for the annular shaped receptacle 2, has at its top a cover plate 14.

The agitating means comprises a top plate 15, having four arms 16, extending downwardly parallel to and spaced slightly from the center column 5 and fastened to a bottom ring 17. The frame 15 rests on the top of a flange 18, the latter being attached to drive shaft 19. In the plate 15 are two holes through which extend driving lugs 20, the lugs being attached to the flange 18. The flange 18 is rigidly secured to the shaft 19. The lower face of the flange 18 bears on the moving part of the thrust bearing 21; the stationary part of the thrust bearing rests on the top plate 14. To remove the agitating member, thumb screw 22 is taken off and the complete frame 15, 16, 17 and connected parts lifts out of the container.

Any suitable number of arms 16 may be employed and there is illustrated in the drawings four such arms. Likewise on these arms any suitable number of short, horizontal, projecting shafts 23 may be mounted. From these shafts hang the agitating paddles 24. The latter are mounted as shown in Figs. 3 and 4 to swing in a limited arc and are all mounted in an identical manner so as to exert a downward and slightly horizontal push on the mixture in the container. A pin 23a set in each of the shafts 23 and working in a slot 24a in the paddle serves to limit the movement of the paddle to the dotted-line position indicated. This placing of all the paddles to give a downward push at all times is important for it assures, as much as is possible, that a substantial number of the floating particles in the mixture will be kept submerged, preferably to a point near the bottom of the container. In practice the action of the paddles has been found to keep a substantial number of the ice particles in the lower confines of the container in what might be termed the "draw-off zone", that is, the region adjacent the two outlets to the faucets.

The shaft 19 extends through the refrigerating coil contained in the column 5 and through a bearing provided in the plate 25 and its associated parts. At its lowermost extremity is fastened a pinion gear 26, the latter being actuated by the reciprocating rack 27. The rack is held against the pinion 26 by means of the spring 28, and thereby provides a safety feature of allowing the rack to slip over the pinion in the event that anything should interfere with the freedom of rotation of the shaft 19 and the agitating members. A small motor 28, having a suitable driving mechanism 29, drives the crank 30 at the end of which the racks 27 are pivoted. It will thus be seen that as the crank 30 rotates, the racks 27 move back and forth and impart an oscillating movement to the shaft 19 and the agitator frame 15 with its associated parts, including the agitator paddles 24. This manner of arranging the parts results in a particularly compact machine and especially in giving a free access to the top of the container.

As already stated, the action of the oscillating paddles, arranged all to exert a downward push on the mixture, distributes the frozen particles well into the bottom of the container. It has been found in practice (see Fig. 5) that more of the ice particles are kept submerged to a depth surrounding the upper faucet outlet than around the lower faucet outlet. This is an advantage produced by this invention for by employing the double faucet, now to be described, the operator can dispense to the customer a drink having more or less ice content, depending upon whether drawn from the upper faucet or from the lower faucet.

Mounted on the front of each of the shells 12 is a double faucet structure 31, comprised of an upper passage 32, a lower passage 33, each provided with shoulders 32a and 33a, respectively, for engagement against the container wall 3, the latter having openings at these points to receive the pipes 32 and 33. The joints at the shoulders 32a and 33a are made tight by means of screws 34 which hold the double faucet firmly against the container base wall 3.

Through each horizontal pipe 32 and 33 extends a valve lever 35, having at one end the operating button 36 and at the other end a poppet-type valve 37, the latter adapted to normally close the two outlets. Springs 38 aid in keeping the poppet valves closed. Connecting the two horizontal pipes 32 and 33 is a vertical pipe and discharge nozzle 39. From the structure thus described it will be seen that the operator can press either of the buttons 36, depending upon the type of drink desired to be dispensed, and the drink will be discharged into a cup which can be held below the outlet spout 39.

As the essential feature of the drink to be dispensed from this machine is that it should be either hot or semi-frozen, there is provided inside the central column 5 a coil of tubing 40, through which can be circulated either a refrigerating medium or a heating medium, depending upon whether the machine is used for dispensing warm drinks in the winter time, such as hot chocolate, or cold drinks in the summer time, such as the fruit drinks already referred to. As illustrated, the machine is provided with a refrigerating unit in its base and the coil 40 is connected to said unit.

The refrigerating unit comprises a motor 41 direct connected to drive compressor 42. Beginning at a point in the cycle, for instance at the exhaust from the compressor, the hot compressed liquid passes through tube 43 into the radiator condenser 44, from whence it passes, still in the liquid state, into the reservoir 45 (the latter also constitutes the base or chassis for the refrigerating unit). From the reservoir the liquid passes through the pipe 46 into a resistance unit 47.

The resistance unit 47 is comprised of a given length of very small tubing 47a and serves to regulate the flow of gas into the evaporator. It balances out the head pressure and the back pressure. Its length should be varied to produce a given flow, depending upon the type of gas used in the system. It replaces the costly and often troublesome diaphragm and sylphon type valves ordinarily used for this purpose.

The gas leaves the resistance unit through pipe 48 and passes to a union 49, from which it is conducted through pipes 50 into the coils 40, and thence through return pipes 51 to a union 52, and through pipe 53 back to the inlet 54 of the compressor 42.

A fan 55 is mounted on an extension of the motor shaft 56 and serves to cool the liquid gas in the radiator condenser 44 by forcing a draught around the coils. In the base of the machine suitable openings 57 are provided to give adequate air circulation.

When it is desired to serve a hot drink, steam and hot water are piped from a suitable source to the union 49 and allowed to exhaust through a pipe connected to union 52.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is—

1. In a beverage conditioning and dispensing machine the combination of a container, refrigerating means arranged against one wall of said container, a frame mounted for oscillation in said container, means for imparting an oscillatory movement to said frame, and a plurality of paddles carried by said frame all hinged thereto at their upper ends and when oscillated exerting a downward push on the mixture whereby the floating particles in the beverage are kept submerged in the draw-off zone of said container.

2. In a beverage conditioning and dispensing machine the combination of a container, refrigerating means arranged against one wall of said container, a frame mounted for oscillation in said container, means for imparting an oscillatory movement to said frame, a plurality of paddles carried by said frame all hinged thereto at their upper ends and when oscillated exerting a downward push on the mixture whereby the floating particles in the beverage are kept submerged in the draw-off zone of said container, and means for drawing off the liquid at different levels.

3. In a beverage conditioning and dispensing machine the combination of a container, refrigerating means arranged against one wall of said container, a frame mounted for oscillation in said container, means for imparting an oscillatory movement to said frame, a plurality of paddles carried by said frame all hinged thereto at their upper ends and when oscillated exerting a downward push on the mixture whereby the floating particles in the beverage are kept submerged in the draw-off zone of said container, an outlet positioned near the bottom of said container, a second outlet positioned on the wall of said container above the first-named outlet, and a two-level faucet structure arranged to fit in said outlets comprising a valve structure arranged in each outlet.

4. In a beverage conditioning and dispensing machine the combination of a container, refrigerating means arranged against one wall of said container, a frame mounted for oscillation in said container, means for imparting an oscillatory movement to said frame, a plurality of paddles carried by said frame all hinged thereto at their upper ends and when oscillated exerting a downward push on the mixture whereby the floating particles in the beverage are kept submerged in the draw-off zone of said container, a faucet connected to said container near its bottom, and a second faucet connected to said container at a point between its bottom and top but above the first-named faucet, whereby a drink of different ice content may be selected and dispensed from each faucet.

5. In a beverage conditioning and dispensing machine the combination of a container, a cylindrical cooling unit disposed in said container, scraping means which oscillates around said unit to remove frozen particles therefrom, and downwardly hanging paddles which swing from shafts set in said scraping means whereby the loosed ice particles are pushed to the bottom of the mixture.

6. In a beverage conditioning and dispensing machine the combination of a container, a refrigerating means providing an ice-forming cylindrical surface in said container, scraping means which oscillates around said unit to remove frozen particles therefrom, and downwardly hanging paddles which swing from shafts set in said scraping means whereby the loosed ice particles are pushed to the bottom of the mixture.

7. In a beverage conditioning and dispensing machine the combination of a container, a cylindrical cooling unit disposed in said container, a frame mounted for oscillation in said container, a shaft extending up through said cooling unit adapted to be driven from beneath the container and at its top end to support said frame, the latter's removal through the top of the container being thereby unobstructed.

8. In a beverage conditioning and dispensing machine the combination of a container, a cylindrical cooling unit disposed in said container, a frame mounted for oscillation in said container, a shaft extending up through said cooling unit adapted to be driven from beneath the container and at its top end to support said frame, the latter's removal through the top of the container being thereby unobstructed, and a plurality of paddles carried by said frame all hinged thereto at their upper ends and when oscillated exerting a downward push on the mixture whereby the floating particles in the beverage are kept submerged in the draw-off zone of said container.

9. In a beverage dispensing and conditioning machine, a container for the liquid having an upwardly extending re-entrant portion forming a cooling chamber sealed off from the liquid contents of the container, and a cooling coil in said cooling chamber in heat exchanging relation to the liquid contents of the container, in combination with agitating and scraping means within the container in cooperative relation with the walls of the cooling chamber, and means operating through the cooling chamber for operating the said agitating and scraping means.

10. In a beverage conditioning and dispensing machine, the combination of a container for liquids having a base portion, a cooling system therefor including a re-entrant cylinder portion extending upwardly from the bottom of the container to a point near the top of the interior of the container, a shaft extending upwardly through the re-entrant portion and journaled therein, a cross-head on said shaft within the container and carrying co-acting scrapers and stirrers contacting the external perimeter of the re-entrant cylinder member, and means concealed in the base for oscillating the shaft to operate the stirrers and scrapers.

RAYMOND H. DOWNER.

DISCLAIMER 1,954,518.—*Raymond H. Downer*, San Francisco, Calif. BEVERAGE DISPLAYING, REFRIGERATING, CONDITIONING, AND DISPENSING MACHINE. Patent dated April 10, 1934. Disclaimer filed December 6, 1934, by the assignee, *Frigidrinks, Inc.*

Hereby disclaims that part of the claims in the specification of said patent, namely, claim 5 and claim 6, which are in the following words, to wit:

"5. In a beverage conditioning and dispensing machine the combination of a container, a cylindrical cooling unit disposed in said container, scraping means which oscillates around said unit to remove frozen particles therefrom, and downwardly hanging paddles which swing from shafts set in said scraping means whereby the loosed ice particles are pushed to the bottom of the mixture.

"6. In a beverage conditioning and dispensing machine the combination of a container, a refrigerating means providing an ice-forming cylindrical surface in said container, scraping means which oscillates around said unit to remove frozen particles therefrom, and downwardly hanging paddles which swing from shafts set in said scraping means whereby the loosed ice particles are pushed to the bottom of the mixture."

[*Official Gazette January 1, 1935.*]